(12) United States Patent
Woolley (10) Patent No.: US 6,411,666 B1
(45) Date of Patent: *Jun. 25, 2002

(54) METHOD AND APPARATUS TO PRODUCE AND MAINTAIN A THICK, FLOWING, LIQUID LITHIUM FIRST WALL FOR TOROIDAL MAGNETIC CONFINEMENT DT FUSION REACTORS

(75) Inventor: Robert D. Woolley, Hillsborough, NJ (US)

(73) Assignee: The United States of America as represented by the United States Department of Energy, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,254

(22) Filed: Oct. 21, 1998

(51) Int. Cl.$^7$ .................................................. G21B 1/00
(52) U.S. Cl. .......................... 376/136; 376/146; 376/150
(58) Field of Search ................................. 376/136, 150, 376/125, 146

(56) References Cited

U.S. PATENT DOCUMENTS

| | | | | |
|---|---|---|---|---|
| 3,677,326 A | * | 7/1972 | Grosse | 165/1 |
| 3,708,391 A | * | 1/1973 | Christofilos | 176/4 |
| 3,762,992 A | * | 10/1973 | Hedstrom | 176/1 |
| 4,228,380 A | * | 10/1980 | Wells | 315/111.4 |
| 4,252,605 A | * | 2/1981 | Schaffer | 176/1 |
| 4,260,455 A | * | 4/1981 | Moir | 176/9 |
| 4,305,784 A | * | 12/1981 | Ohkawa | 376/125 |
| 4,344,911 A | * | 8/1982 | Maniscalco et al. | 376/150 |

FOREIGN PATENT DOCUMENTS

JP        0077382    *  5/1984   ................. 376/352

* cited by examiner

*Primary Examiner*—Harvey E. Behrend
(74) *Attorney, Agent, or Firm*—Mark P. Dvorscak; Bradley W. Smith; Virginia B. Caress (57) ABSTRACT

A system for forming a thick flowing liquid metal, in this case lithium, layer on the inside wall of a toroid containing the plasma of a deuterium-tritium fusion reactor. The presence of the liquid metal layer or first wall serves to prevent neutron damage to the walls of the toroid. A poloidal current in the liquid metal layer is oriented so that it flows in the same direction as the current in a series of external magnets used to confine the plasma. This current alignment results in the liquid metal being forced against the wall of the toroid. After the liquid metal exits the toroid it is pumped to a heat extraction and power conversion device prior to being reentering the toroid.

17 Claims, 8 Drawing Sheets

METHOD AND APPARATUS TO PRODUCE AND MAINTAIN A THICK, FLOWING, LIQUID LITHIUM FIRST WALL FOR TOROIDAL MAGNETIC CONFINEMENT DT FUSION REACTORS

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

This invention relates to thermonuclear fusion reactors and specifically to a method and system for producing and maintaining a thick flowing liquid lithium blanket or first wall for toroidal magnetic confinement deuterium-tritium (DT) fusion reactors.

Prior art conceptual designs of toroidal magnetic confinement DT fusion reactors included an extremely complicated "blanket" located adjacent to and surrounding the fusion plasma. In many designs, the blanket is composed of solid materials which act as a plasma facing "first wall" and as plumbing to carry a heat transfer fluid which functions to transfer the heat generated by the fusion plasma from the reactor to an external heat sink. It is expected that these solid material blankets would be severely damaged over time by the bombardment of high energy fusion neutrons, by erosion caused by sputtering, by high heat fluxes during normal operations, and by very high heat fluxes, ablation, and large electromagnetic forces during plasma disruptions.

In a field which is not yet developed, such as fusion reactors, design parameters are difficult to quantify. Technical studies have identified the prior art blanket as a problem area, one which some critics have insisted threatens the economic practicality of fusion power. Anticipated initial development costs of the prior art blankets was dominated by the need to synthesize new solid materials capable of operating in the severe environment of a fusion reactor with a focus on reducing the unavoidable periodic replacement of the blanket components. Anticipated recurring costs included frequent replacement and repair of the components by complex new modules made of the hypothetical new materials. The projected overall fusion economics was also governed by the need to design for heat fluxes in blanket components.

Applicant's liquid metal blanket system and method provides for flowing a thick liquid lithium blanket or first wall adjacent to the plasma. Since liquid lithium has no crystalline structure, it can not be damaged by high energy fusion neutron bombardment. The layer of liquid lithium also protects solid objects under the layer by acting as a moderator to slow the fusion neutrons to benign energy levels after they pass through the lithium layer. Since the first wall or lithium layer is in motion, it is continually renewing itself and thus, will not be permanently damaged by sputtering erosion, ablation, or the presence of mechanical cracks as are solid structures. In addition, due to the large thermal capacity of liquid lithium, the flowing lithium layer can provide for high heat flux rates. In another embodiment, the insulators and electrodes, present in the apparatus, have a distorted shape or orientation to minimize neutron streaming. A further embodiment employs the use of an insulator positioned at the top of the toroid, containing the plasma, and one positioned at the bottom, thus, separating the lithium streams both at the top and bottom of the toroid. This improves the distribution of the electrical potential facing the plasma. In the final embodiment, two liquid lithium layers are nested to form a low vapor pressure surface.

Accordingly a first object of the present invention is to provide a first wall which does not incur significant damage under bombardment by high energy neutrons.

A second object of the invention is to provide a moving layer with good thermal properties to provide high heat flux densities to remove the heat generated by the fusion process.

A third object of the invention is to provide a method and system for producing and maintaining a thick flowing first wall.

Other objects and advantages of the invention will become apparent from the following description and accompanying drawings.

SUMMARY OF THE INVENTION

The subject invention is a flowing liquid metal, preferably lithium, first wall or blanket for a toroidal magnetic confinement deuterium-tritium (DT) fusion reactor. The presence of a flowing layer or blanket adjacent to the plasma to form a first wall eliminates neutron damage. In addition since liquid lithium is a good conductor of heat, the flowing liquid layer allows for the use of high heat flux densities.

The first wall is formed by injecting two axisymmetric positioned streams of liquid metal, preferably lithium, through an entry port at the top portion of a toroidal chamber containing the fusion plasma. An electrical current is supplied to both streams of liquid lithium in such a manner that the direction of current flow in the liquid lithium layer is the same as the direction of current flow in the toroidal field coils. The force on the lithium layer due to the current flowing in the lithium in combination with the magnetic field internal to the toroid keeps the lithium layer in contact with the inner wall of the toroid. On reaching the bottom of the toroidal chamber both lithium streams flow out of the chamber and are reprocessed to be used again. Modifications to the positioning of the current electrodes and insulators can be made to change the properties of the system.

In an alternate embodiment, the liquid lithium layer is composed of two sublayers of liquid lithium each at a different temperature. The outer sublayer next to the toroid wall is warmer than the inner sublayer which is next to the plasma. the inner sublayer is heated by the fusion plasma during its descent and on reaching the base of the toroid the liquid lithium exits the toroid and is pumped back to the top of the toroid to be injected as the outer sublayer. This embodiment serves to reduce the vapor pressure of the inner liquid lithium sublayer.

DETAILED DESCRIPTION OF THE INVENTION

Figure 1:
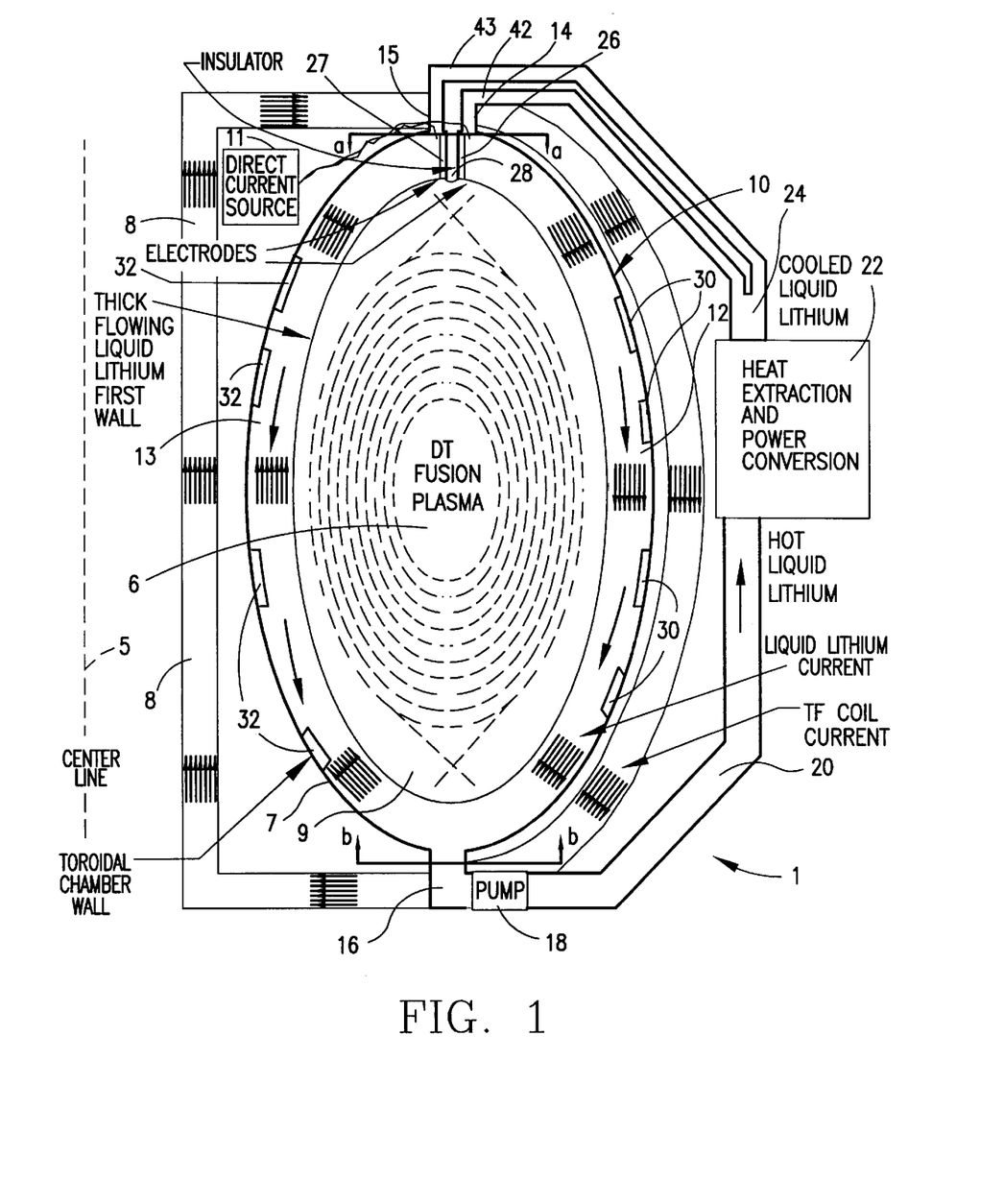
FIG. 1 is a schematic representation of the liquid lithium first wall or blanket with external heat extraction.

A toroidal vessel system 1 containing a magnetically confined DT fusion plasma and a liquid metal first wall is depicted in FIG. 1. The system 1 is axisymmetric about centerline 5, whereas the complete structure of system 1 is obtained by rotating the cross-section shown 360° about centerline 5. The toroidal field coils 8 are spaced around the toroid 10 so as to magnetically contain the plasma 6 within the toroidal chamber 9. The toroidal field coils 8 are positioned external to the toroidal vessel 10. Liquid metal, preferably lithium, enters the toroidal vessel chamber 9 as a continuous stream through apertures 14 and 15 located at the top of the toroidal vessel 10 forming two axisymmetric streams of liquid metal 12 and 13. The thick liquid metal streams 12 and 13 continuously flow down each side of the inner wall 7 of the toroidal vessel 10 and exit through a common exit aperture 16 at the base of the toroidal vessel 10. A pump 18 pumps the hot liquid lithium 20 from the base of the toroid 10 to a heat extraction and power conversation unit 22. As the cooled liquid lithium 24 flows back to the top of the toroid for reuse, it is divided into two streams 42 and 43. Two electrodes 26 and 27 separated by an insulator 28 are positioned at the top interior of the toroid 10. The electrodes 26 and 27 are positioned at the edge of the openings 14 and 15 allowing the liquid lithium stream to enter the toroid 10 and to establish electrical contact between the respective liquid lithium stream and its respective electrode. When energized by a direct current source 11 the electrodes 26 and 27 provide a poloidal current which flows in the lithium layers 12 and 13. The current source 11 is connected to the electrodes 26 and 27 so that the poloidal current flows in the same direction as the current in the toroidal field coils 8 which surround the toroid 10.

Figure 2:
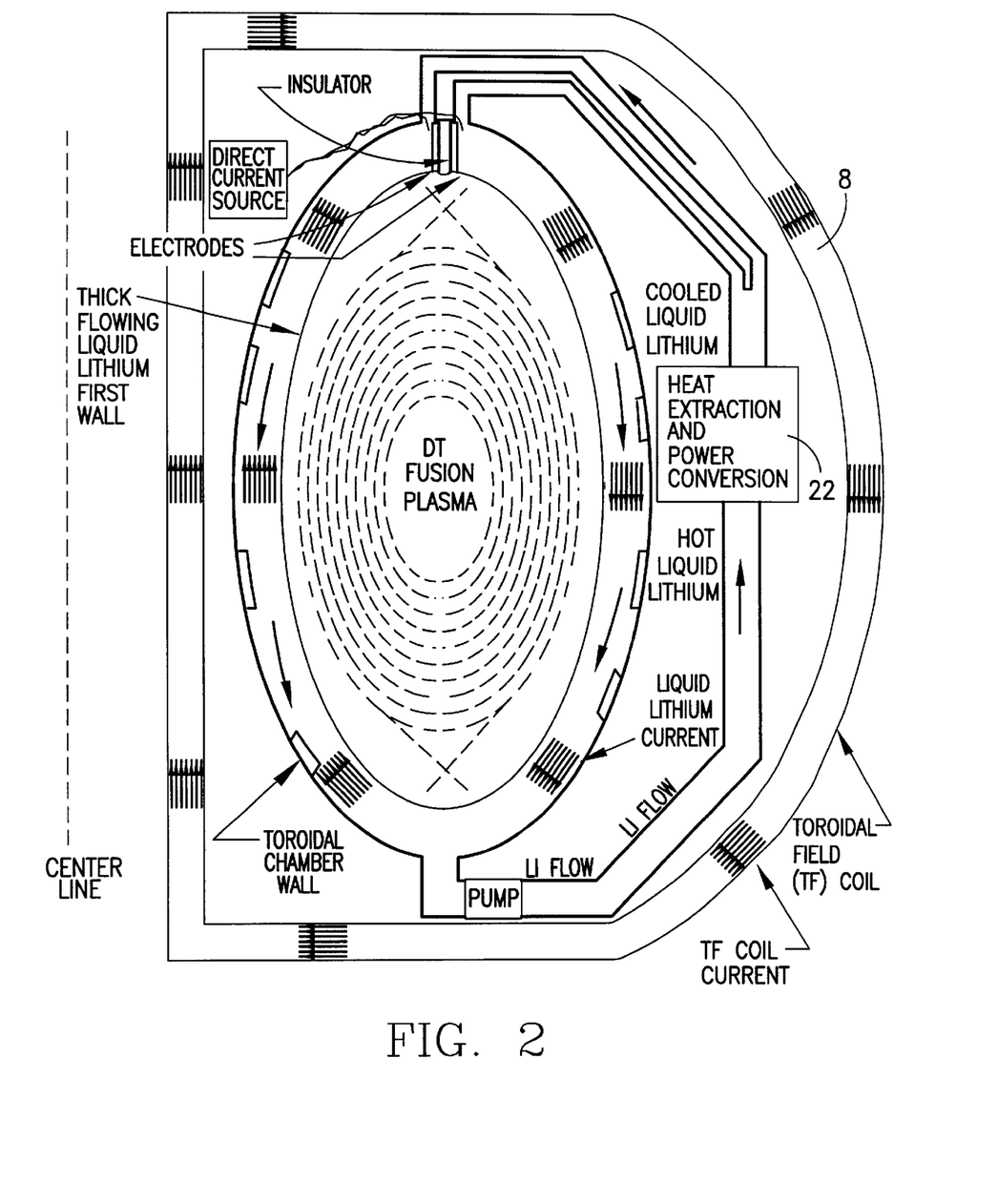
FIG. 2 is a schematic representation of the electrical current flow for the liquid lithium first wall of FIG. 1 with internal heat extraction.

An alternate embodiment is depicted in FIG. 2. were instead of the heat extraction and power conversion unit 22 being outside of the toroidal field coil 8 the unit is placed inside the field coil 8.

Figure 3A:
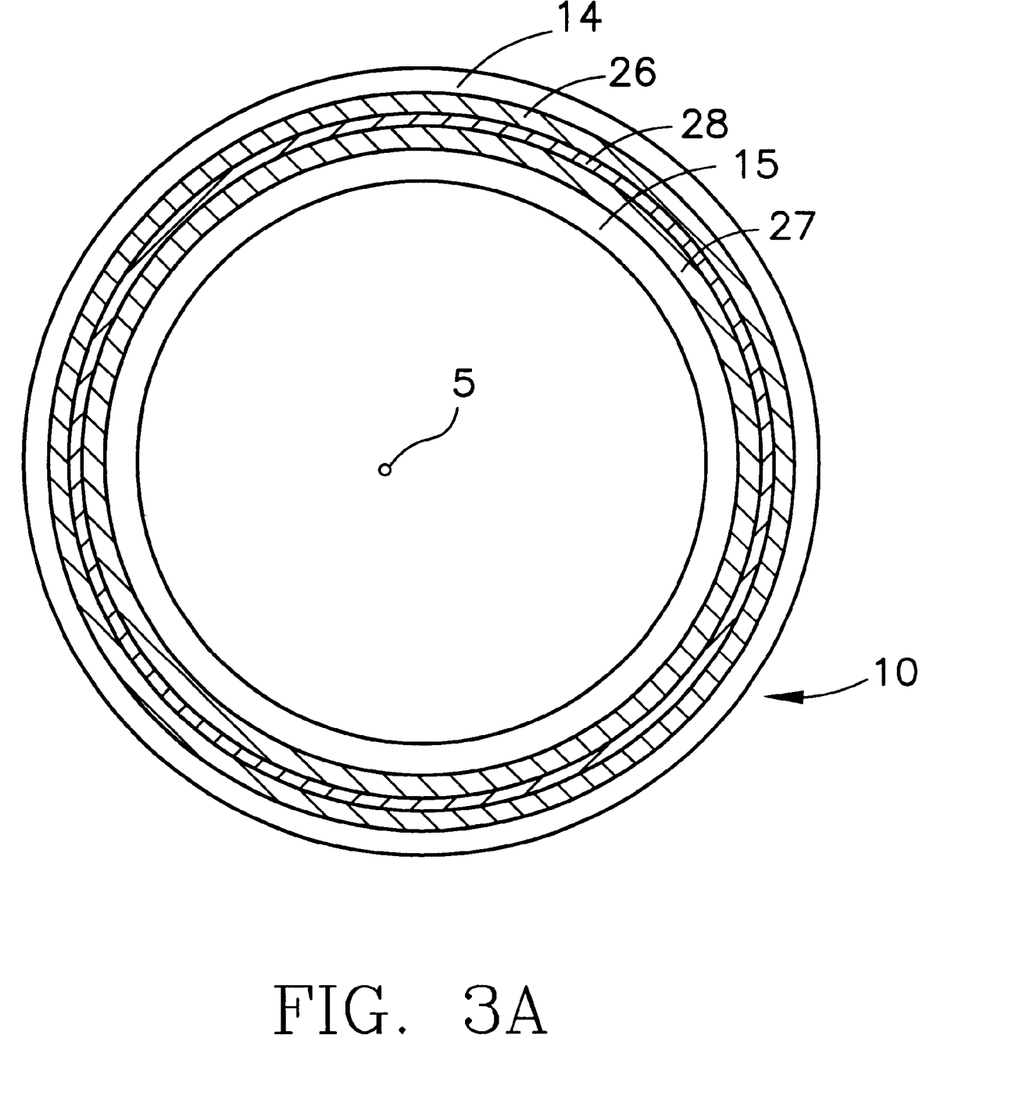
FIG. 3A is a top view of the toroid along section line a—a of FIG. 1.

FIG. 3A depicts a top view of the toroid along section line a—a of FIG. 1. In this view the toroidal field coils 8 are missing. The figure illustrates the symmetry and continuity of the entrance apertures or ducts 14 and 15, the electrodes 26 and 27 and the insulator 28. The axis of symmetry is the toroidal axis 5.

Figure 3B:
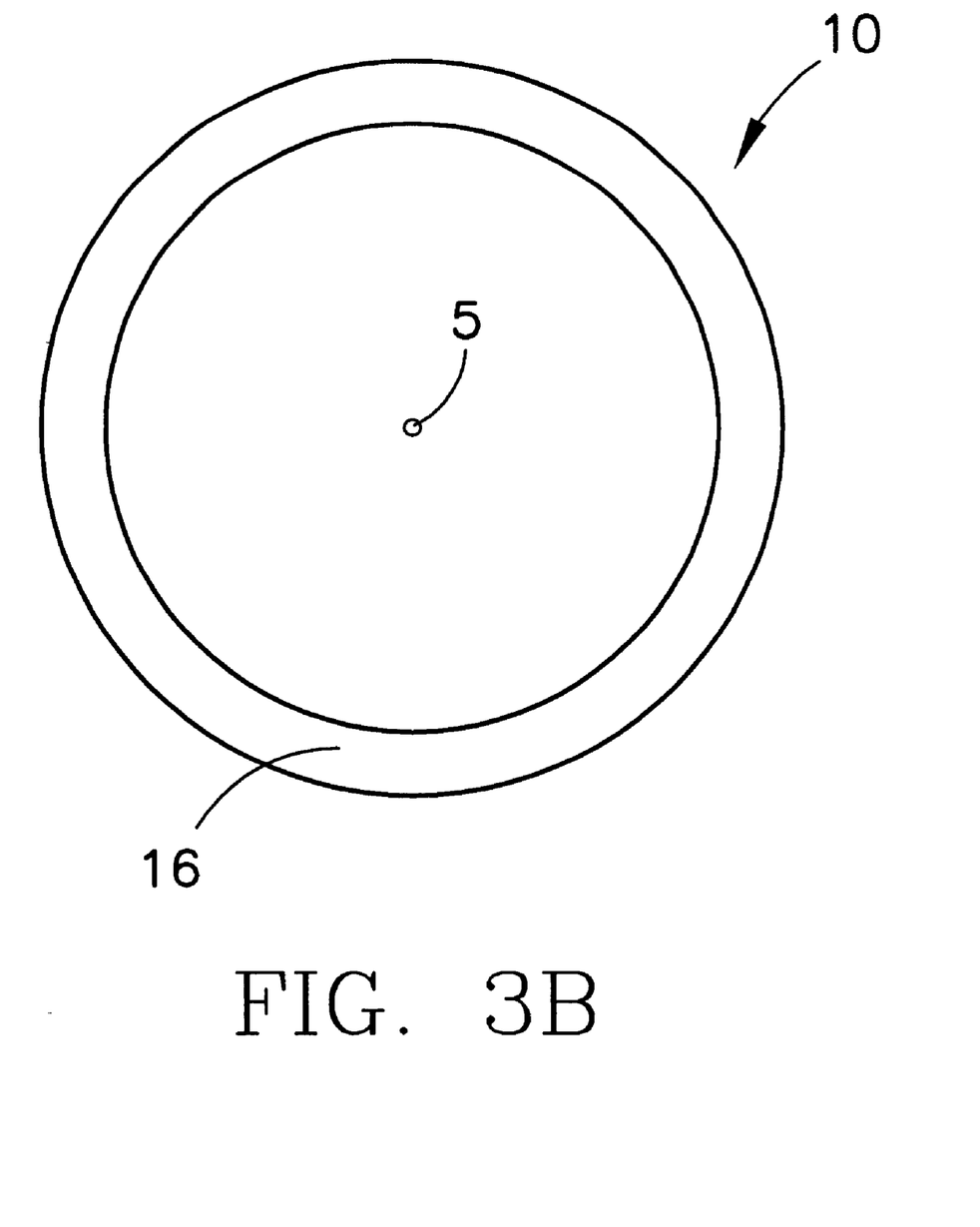
FIG. 3B is a bottom view of the toroid along section line b—b of FIG. 1.

FIG. 3B depicts a bottom view of the toroid along section line b—b of FIG. 1. Also, in this view the toroidal field magnets 8 are missing. The symmetry and continuity of the exit aperture or duct 16 about the toroidal axis 5 is shown.

Figure 4:
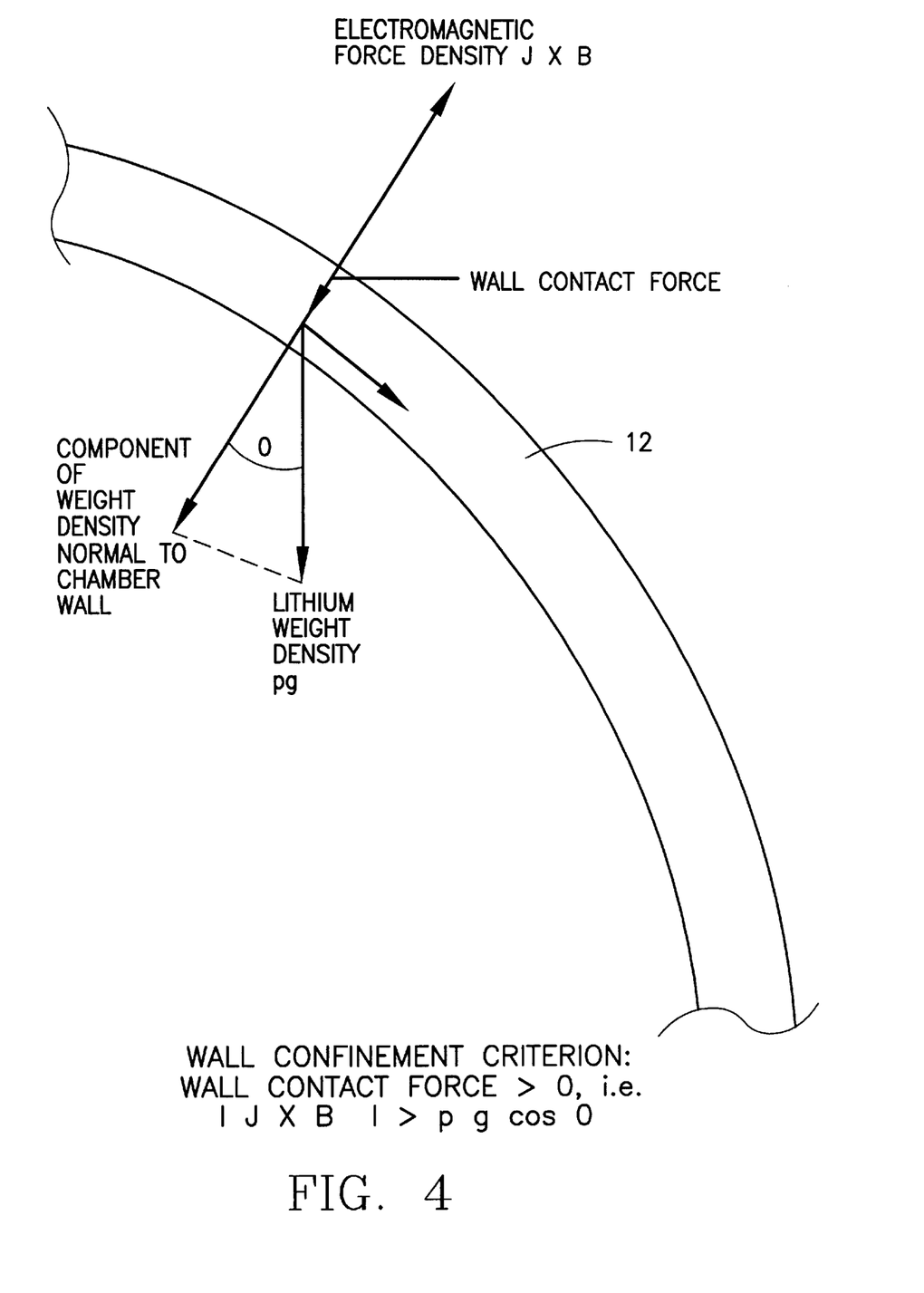
FIG. 4 is force diagram for the liquid lithium wall of FIG. 1.

FIG. 4 depicts a portion of the liquid metal stream and a force diagram resulting from the interaction of the poloidal current in the liquid lithium layer, first wall, and the magnetic field generated in the toroid by the toroidal field coil. This interaction results in electromagnetic "J×B" forces which push the liquid lithium stream 12 against the toroidal chamber wall, thus, keeping the stream away from the plasma. Under the combined influence of gravity and electromagnetic forces, the stream moves along the chamber wall to the base of the chamber where it exits through exit apertures 16.

Figure 5:
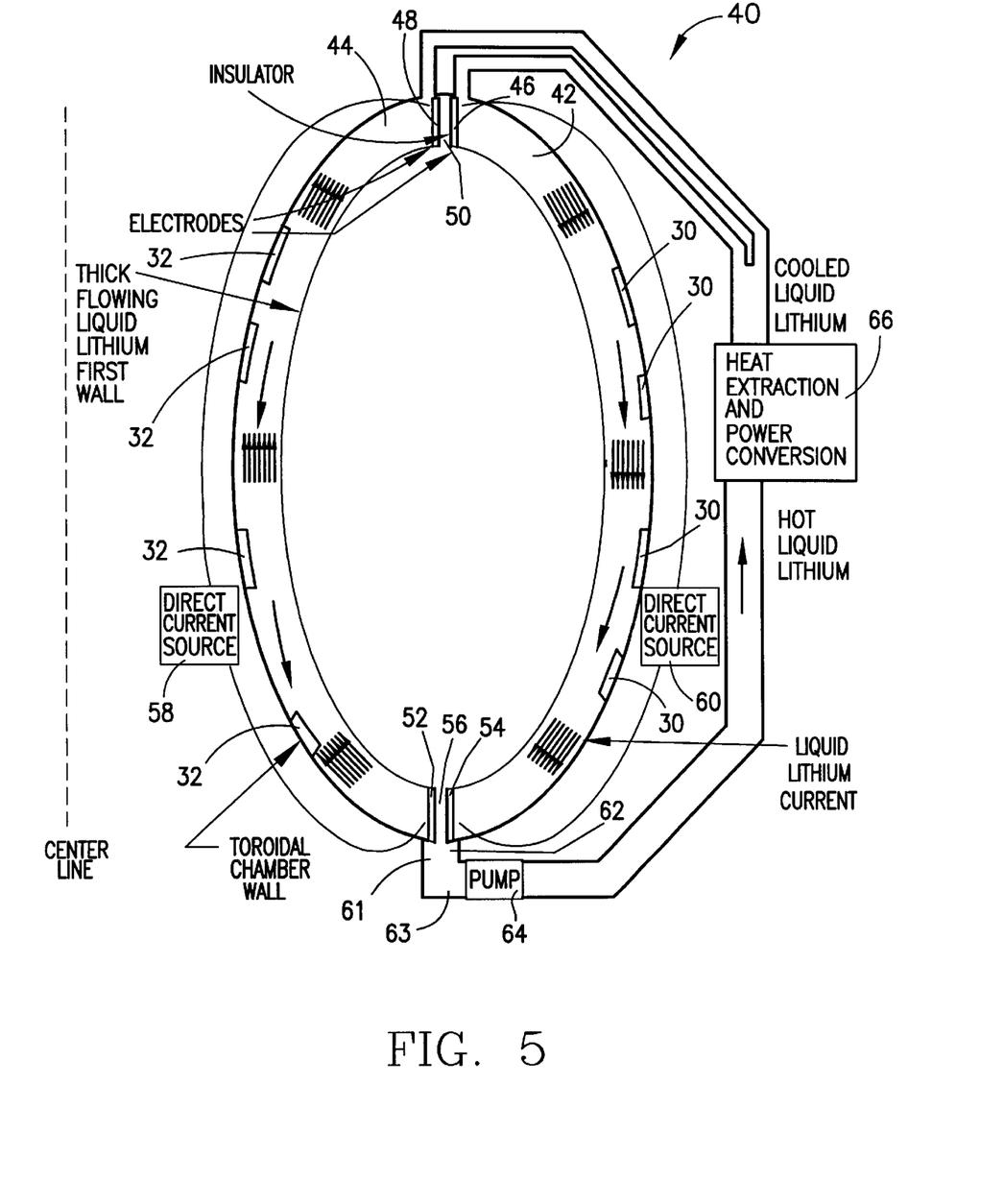
FIG. 5 is a schematic representation of a second embodiment of the liquid lithium first wall.

FIG. 5 depicts an alternate embodiment 40 where the first stream 42 and the second stream 44 enter the toroid at the upper end of the toroid Each stream is electrically coupled to a specific electrode 46 and 48 respectively. The electrodes 46 and 48 are insulated from each other by an insulator 50. At the base of the toroid, each stream is electrically coupled to another electrode 52 and 54. As at the top of the toroid, the two electrodes 52 and 54 are electrically insulated from each other by an insulator 56. The paired electrodes, 48 and 52, and, 46 and 54, are each connected to individual current sources 58 and 60 respectively. Electrodes 48 and 52 which are in contact with the liquid lithium conduct the current supplied by the external direct-current power sources 58 and 60 to produce the lithium-confining poloidal currents. As in the prior embodiment, when each liquid lithium stream 44 or 46 reaches the base of the toroid it flows through orifices 61 and 62 respectively into a common pipe 63 and is pumped by a pump 64 to a heat extraction and power conversion unit 66. The insulating structure 50, also, serves as a site for external access to the plasma for diagnostics, for DT fueling and exhaust, and for plasma current profile control.

This invention can also incorporate passive electrical conducting solid structures 30 and 32 mounted on the chamber walls and immersed in the flowing liquid lithium layers 12 and 13 FIG. 1 and FIG. 4. The structures produce eddy currents in the flowing liquid metal causing the poloidal currents within the liquid metal to interact with the applied magnetic to produce "J×B" forces which limit the flow velocity of the descending liquid lithium to the desired design values. These structures are only optional and are not a required item.

Figure 6:
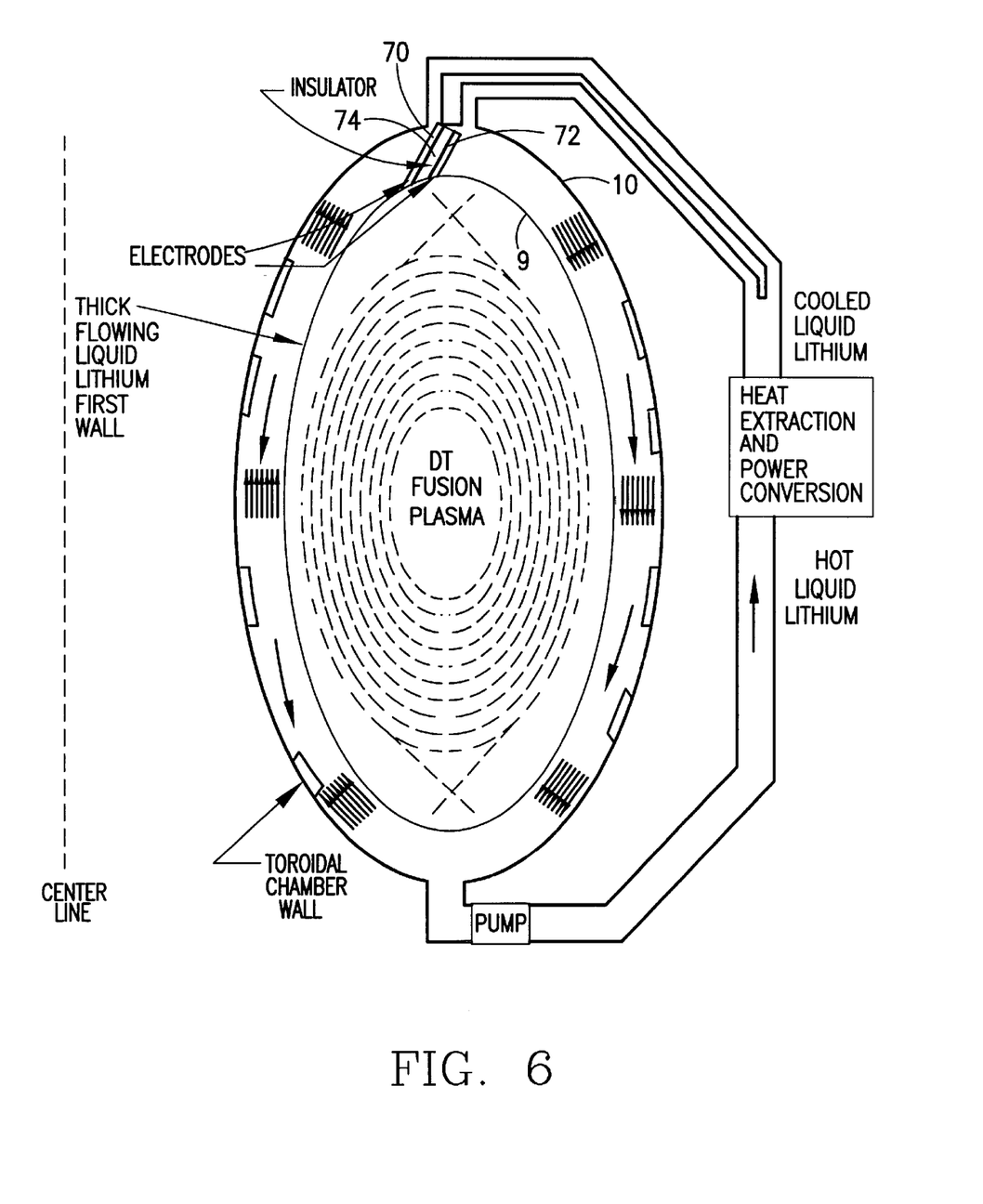
FIG. 6 is a schematic representation of a third embodiment of the liquid lithium first wall.

In an alternate embodiment to reduce neutron streaming, FIG. 6, the electrodes and insulator 70, 72, and 74 are skewed to that they are no longer approximately perpendicular to the inner surface 9 of the toroid 10.

Figure 7:
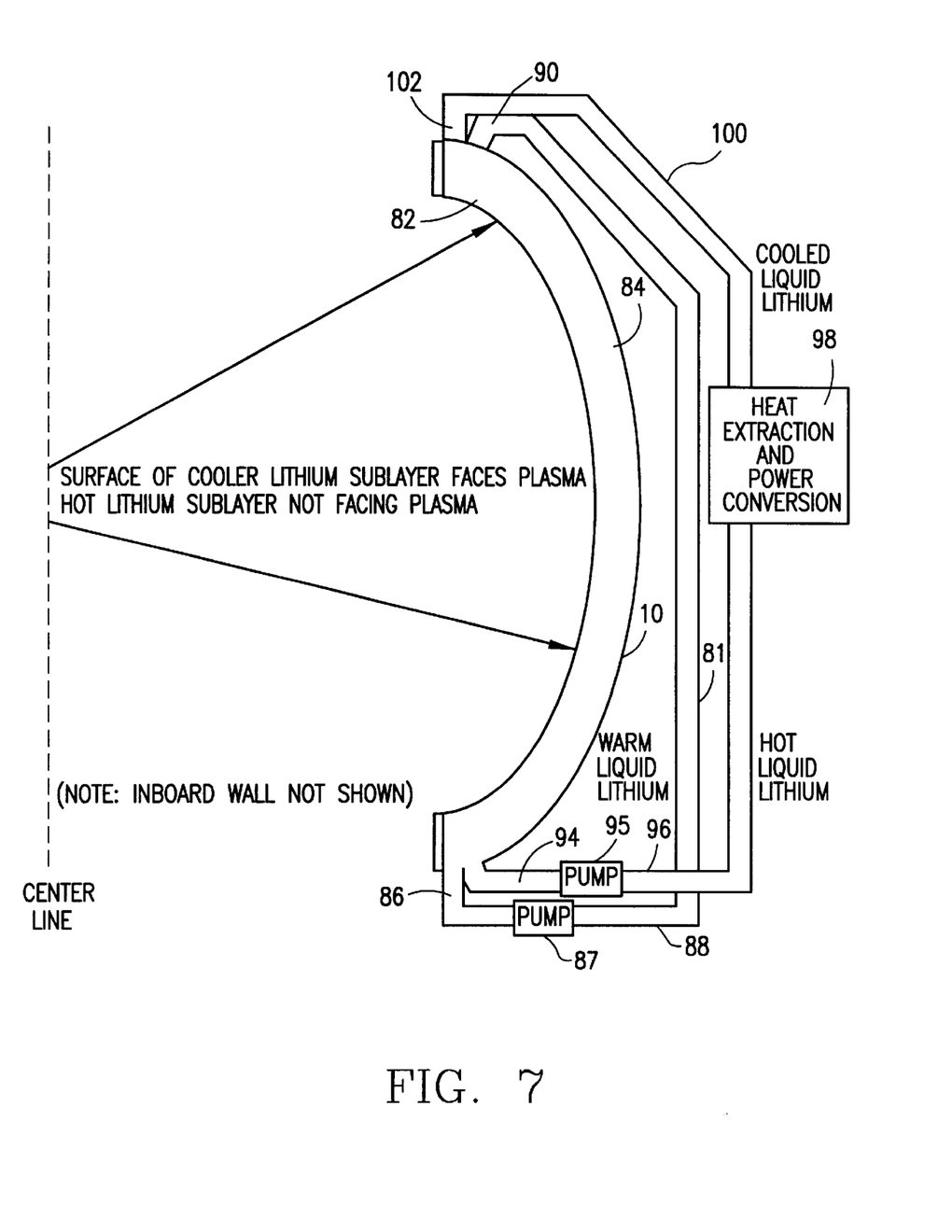
FIG. 7 is a schematic representation of a fourth embodiment of the liquid lithium first wall To the extent practical, the same reference numerals are used for the same element in each of the figures.

A further embodiment provides for a lower surface vapor pressure of the plasma-facing liquid lithium layer. This is achieved by providing for a liquid lithium sublayer relative to the outer layer which is exposed to the plasma, FIG. 7. To achieve this dual layer approach, relatively cool inner layers 82 are injected axially symmetrically at the top of the toroid 10 (only one side of the symmetrical toroid liquid lithium system is shown). The inner layer 82 rides on the hotter outer layer 84 (only one side shown). The two layers 82 and 84 will not mix or interchange because liquid metal flowing in a strongly magnetic field is laminar not turbulent. The relatively cool inner layer 82 will descend more rapidly than the hot outer layer 84. When the inner layer reaches the base of the toroid 86, it is pumped, by pump 87, via the return pipe 88 back to the top of the toroid and reinjected, through port 90 as the warm outer layer 84. The outer liquid lithium layer 84 descends along the inner wall of the toroid 10 and exits at the base of the toroid through port 94 as hot liquid lithium. The hot liquid lithium 96 is pumped, by pump 95, to a heat extraction and power conversion device 98 which cools the liquid lithium. This cooled liquid lithium 100 is then injected as the inner layer 82 at the top of the toroid through port 102. When the hot layer 96 is cooled to just above the lithium melting point, 181° C., the vapor pressure is in the neighborhood of $10^{-10}$ torr. If the inner layer 82 exits the toroid at a temperature of 271° C. after absorbing about 16% of the fusion heating from alpha heating, this corresponds to a surface vapor pressure of $10^{-7}$ torr. After reinjection as the outer sublayer 84, the lithium leaves the base of the toroid at approximately 745° C. which is then used to generate power. The outer sublayer 84 is more closely coupled to the wall of the toroid and descends more slowly than the inner layer 82. Laminar flow ensures that the hot exiting liquid lithium (with 1 torr vapor pressure) will never directly face the plasma.

In order to both moderate i.e., slow down, the 14 Mev neutrons and adequately breed tritium, natural liquid lithium blanket designs for pure DT fusion reactors must be typically on the order of 1 meter in thickness. Furthermore the need to be of low atomic number (low-Z) walls for magnetic fusion so that if any impurities enter the hydrogenic Z=1 DT plasma from the wall, such impurities would not greatly increase radiative losses. Pure lithium is good in this respect as it has a low atomic number Z=3. On the other hand, the salt of liquid lithium and beryllium, known as "FLIBE", should not be used as a first wall for magnetic fusion since it contains fluorine, which is expected to greatly increase plasma radiative losses and thus degrade energy confinement Liquid Lithium's vapor pressure is extremely low, which is a requirement for using liquid walls with magnetic fusion. Examined references state lithium's $10^{-10}$ Torr vapor pressure at selected temperatures and vapor pressure formulae accurate for temperatures above 700° C. These formulae have been used to calculate the following table:

TABLE 1

| Temperature | Measured Li Vapor Pressure | Referenced 1 Formula Li Vapor Pressure | Referenced 2 Formula Li Vapor Pressure |
| --- | --- | --- | --- |
| 180.54° C. (melting) | 1.0* $10^{-10}$ Torr | 1.1* $10^{-10}$ Torr | 1.4* $10^{-10}$ Torr |
| 200° C. | | 6.1* $10^{-10}$ Torr | 7.9* $10^{-10}$ Torr |
| 236° C. | | 1.0* $10^{-8}$ Torr | 1.3* $10^{-8}$ Torr |
| 270° C. | | 1.0* $10^{-7}$ Torr | 1.3* $10^{-7}$ Torr |
| 300° C. | | 6.1* $10^{-7}$ Torr | 7.7* $10^{-7}$ Torr |
| 400° C. | | 8.0* $10^{-5}$ Torr | 9.4* $10^{-5}$ Torr |
| 500° C. | | 2.9* $10^{-3}$ Torr | 3.3* $10^{-3}$ Torr |
| 600° C. | | 4.7* $10^{-2}$ Torr | 5.1* $10^{-2}$ Torr |
| 700° C. | | 4.3* $10^{-1}$ Torr | 4.5* $10^{-1}$ Torr |
| 745° C. | 1.0 Torr | 1.0 Torr | 1.0 Torr |
| 800° C. | | 2.6 Torr | 2.6 Torr |
| 1247° C. (boiling) | 766 Torr (1 atm.) | 941 Torr | 813 Torr |

Note for comparison that typical vacuum "base pressures" on the TFTR varied from sightly below $10^{-8}$ Torr to several times $10^{-8}$ Torr, and when the "base pressure" was $10^{-7}$ Torr or higher, some type of surface "cleanup" operation was usually attempted. Based on this TFTR experience, one might expect that a tokamak reactor plasma would tolerate a liquid lithium first wall whose surface vapor pressure does not exceed $10^{-8}$ Torr. However, it is conceivable that a fusion reactor plasma might tolerate a much higher lithium surface vapor pressure after the plasma is initially establish. Moreover, rather than degrade performance, it was found that deliberately introduced lithium impurities in the plasma edge region actually seemed to improve plasma performance in TFTR experiments.

Studies of lithium/helium LMMHD Power conversion have identified 800° C. as a maximum design temperature above which systems performance does not significantly improve. Materials such as vanadium are compatible with liquid lithium up to this maximum temperature, but not significantly beyond. However, most fusion design studies considering liquid lithium in blankets have chosen a lower maximum design temperature. Liquid Lithium density varies linearly from 515 kg/m³ at 200° C. to 454 kg/m³ at 800° C. with a very high heat capacity, making it useful in heat transfer applications. It's heat capacity is 1.01±0.04 cal/(gm° C.) over the temperature range 181° C.–800° C. Thus, 1.23 Gigajoules/m³ heat raises the temperature from 200° C. to 800° C. Furthermore, lithium melts at about 180.54° C. and requires 103.2 cal/gm "heat of fusion" to melt.

Thus, melting lithium requires about 0.22 Gigajoules/m of heat. Indeed, if the heat needed to raise the temperature from room temperature is included, i.e., from 25° C. to 185° C.00, a total of about 0.57 Gigajoules/m³ of heat to completely melt the lithium is needed. Furthermore, liquid lithium's thermal conductivity varies linearly from 43 w/(m ° K) at 200° C. to 55 w/(m ° 0K) at 800° C. Combining this with lithium's density and heat capacity results in a heat diffusion constant ranging from 0.2 cm²/sec at 200° C. to 0.3 cm²/sec at 800° C.

It has been determined that liquid lithium has the following electrical resistivity:

TABLE 2

| Temperature | Resistivity ($\eta$) |
| --- | --- |
| 180.54° C. (melting) | 24.80* $10^{-8}$ Ohm-m |
| 200° C. | 25.48* $10^{-8}$ Ohm-m |
| 300° C. | 28.59* $10^{-8}$ Ohm-m |
| 400° C. | 31.40* $10^{-8}$ Ohm-m |
| 500° C. | 34.05* $10^{-8}$ Ohm-m |
| 600° C. | 36.58* $10^{-8}$ Ohm-m |
| 700° C. | 39.06* $10^{-8}$ Ohm-m |
| 800° C. | 41.51* $10^{-8}$ Ohm-m |

Note that in order to electromagnetically hold a liquid lithium layer against the wall (or the ceiling) of a chamber, it is necessary that the component of the J×B product directed towards that chamber wall must exceed the component of the lithium's weight density directed away from the chamber wall, i.e., $\rho g \cos\theta$, where $\theta$ is the angle between the downward vertical and the local inward normal to the wall, $\rho$ is the lithium density, and g is the gravitational acceleration, 9.8 m/sec². Using the maximum possible magnitude of $\rho g \cos\theta$ shows that J>5047/B, where B is in Tesla, is always adequate.

Thus, for example, if a toroidal field within the liquid lithium layers obeys B>5.1 Tesla then a liquid lithium current density of J>1 kA/m² guarantees the liquid lithium will be forced against the chamber ceiling and walls, thus keeping it away from the plasma. Electrical power dissipation by this confining current within the liquid lithium will be negligible compared to the fusion power, i.e., $\eta J^2$>0.35 watts/m³.

For example, an ITER-size DT reactor is contemplated with a plasma having a major radius R=8, a minor radius a=3 meters, a plasma half-height b=5 meters and the plasma is surrounded with a close-fitting liquid lithium blanket with a thickness 1 meter. Then the total volume of liquid lithium is approximately 1300 m³, the total mass of the liquid lithium is about 650,000kg, the total current driven through the lithium must exceed 50 kA, and so the associated dc voltage needed to drive this current exceeds 8.8 millivolts.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. An apparatus for producing a thick flowing liquid metal layer or first wall for a fusion reactor comprising:
   a toroid having a top, a bottom, an inner toroidal chamber, an inner toroidal wall, and a central toroidal axis about which said toroid is axisymmetric;
   a series of toroidal magnets each of which surrounds said toroid and creates a confining magnetic field inside said toroid where said field serves to confine a plasma;
   an entrance means for inputting the liquid metal at said top portion of said toroidal chamber;
   a plurality of electrodes separated by at least one insulator where said electrodes are positioned so that said liquid metal is electrically coupled to said electrodes and where said electrodes are electrically coupled to a power source which when activated results in the formation of a poloidal current in said liquid metal layer and where said poloidal current flows in the same direction as a current in said toroidal magnets so that said poloidal current interacts with a magnetic field formed by said toroidal magnets to force the liquid metal against said inner wall of said toroid;

an exit means located at said bottom of said toroidal chamber where said liquid metal exits said toroidal chamber;

a pump coupled to said exit means;

a heat extraction and power conversion device where said conversion device is fluidly coupled to said pump and said entrance means.

2. The apparatus of claim 1 wherein said liquid metal is lithium.

3. The apparatus of claim 1 where said entrance means is two continuous, concentric fluid entry apertures separated by a conductor—insulator—conductor matrix.

4. The apparatus of claim 3 where said apertures are axisymmetric about said central toroidal axis.

5. The apparatus of claim 1 where electrically conductive structures protrude from the inner wall of said toroid and into said liquid metal layer.

6. The apparatus of claim 5 where said structures are nonsymmetric.

7. The apparatus of claim 1 wherein said electrodes are approximately perpendicular to said inner wall of said toroid.

8. The apparatus of claim 1 wherein said electrodes are not approximately perpendicular to said inner wall of said toroid to reduce neutron streaming.

9. The apparatus of claim 3 where a pair of continuous electrodes of said plurality of electrodes and separated by a continuous insulator are positioned at an upper edge of said entrance means so that the liquid metal streams establish and maintain electrical contact with the electrode as said liquid metal stream enters said toroidal chamber and flows down said inner wall to exit at said bottom of said toroidal cavity, thus, forming a liquid metal conductive link from one electrode to its opposition as separated by said insulator, and where said pair of continuous electrodes and said continuous insulator is axisymmetric about said toroidal axis.

10. The apparatus of claim 4 wherein a first pair of electrodes, separated by a first insulator, is positioned at an upper edge of said entrance means so that said first electrode pair contacts said liquid metal streams as they flow through said entry apertures on entry to said toroidal chamber and a second pair of electrodes, separated by a second insulator, is positioned at a bottom edge of said exit means so that said second electrode contacts said liquid metal stream as it exits said toroidal cavity and where said first pair and said second pair of electrodes is continuous and axisymmetric about said toroidal axis.

11. The apparatus of claim 1 in which said exit means is a continuous exit aperture, axisymmetric about said toroidal axis.

12. The apparatus of claim 10 where said exit means is a pair of concentric apertures positioned near the bottom of the toroidal chamber and where said apertures are axisymmetric about said toroid axis.

13. An apparatus for producing a thick flowing liquid metal layer or first wall for a fusion reactor comprising:

a toroid having a top, a bottom, an inner toroidal chamber, an inner toroidal wall, and a toroidal axis about which said toroid is axisymmetric;

a series of toroidal magnets each of which surrounds said toroid and creates a confining magnetic field inside said toroid which serves to confine a plasma;

a plurality of entrance means for inputting the liquid metal into said top portion of said toroidal chamber;

a plurality of electrodes separated by at least one insulator where said electrodes are positioned so that said liquid metal is electrically coupled to said electrode and where said electrodes are electrically coupled to a power source which when activated results in the formation of a poloidal current in said liquid metal layer and where said poloidal current flows in the same direction as a current in said toroidal magnets so that said poloidal current interacts with a magnetic field formed by said toroidal magnets to force the liquid metal against said inner wall of said toroid;

a plurality of exit means located at said bottom of said toroidal chamber where said liquid metal exits said toroidal chamber;

a plurality of pumps linking said exit means to said entrance means or to a heat extraction and power conversion device where said conversion device is fluidly coupled to one of said entrance means.

14. The apparatus of claim 13 where said plurality of entrance means are formed by a first pair of entrance apertures where said apertures are continuous and axisymmetric about said toroidal axis and a second pair of entrance apertures where said second pair of entrance apertures are continuous, concentric and are axisymmetric about said toroidal axis and encircle said first pair of entrance apertures so that said second entrance pair are further from said top of said toroid than said first entrance pair.

15. The apparatus of claim 14 where said plurality of exit means is formed by a first pair of exit apertures where said first pair are continuous and axisymmetric about said toroidal axis and a second pair of exit apertures where said first pair of exit apertures are continuous, concentric and axisymmetric about said toroidal axis and encircle said first pair of exit apertures so that said second pair of exit apertures are further from the bottom of said toroid than said first pair of exit apertures.

16. The apparatus of claim 15 where a first pair of continuous electrodes of said plurality of electrodes, separated by a continuous insulator, are positioned at an upper edge of said first pair of entrance apertures and a second pair of continuous electrodes, separated by a continuous insulator, are positioned at a bottom edge of said first pair of exit apertures so that a cool liquid metal first layer flows through said first pair of entrance apertures and is in electrical contact with the first electrode pair and a second warm liquid metal streams enters said toroidal chamber through said second pair of entrance apertures and where both streams flow down each side of said toroidal chamber inner wall and where said first layer flows over said second layer with both streams exiting at said bottom of said toroidal chamber at a first pair of exit apertures and a second pair of exit apertures respectively and where said first layer makes electrical contact with said second pair of electrodes, thus, forming a liquid metal conductive link from one electrode to its opposition as linked by said liquid metal and where both pairs of continuous electrodes and both continuous insulators are axisymmetric about said toroidal axis.

17. The apparatus of claim 15 where said heat extraction and power conversion device links said first pair of entrance apertures to a first pump coupled to said second exit pair aperture and where a second pump links said first pair of exit apertures to said second pair of entrance apertures.

* * * * *